US008847648B2

(12) United States Patent
Barroso et al.

(10) Patent No.: US 8,847,648 B2
(45) Date of Patent: Sep. 30, 2014

(54) VOLTAGE PULSE TRAIN GENERATOR, APPLICATION TO THE CONTROL OF AN ULTRASOUND PIEZOELECTRIC INJECTOR

(75) Inventors: Paulo Barroso, Les Mureaux (FR); Clement Nouvel, Clamart (FR)

(73) Assignee: Renault S.A.S., Boulogne Billancourt (FR)

( * ) Notice: Subject to any disclaimer, the term of this patent is extended or adjusted under 35 U.S.C. 154(b) by 556 days.

(21) Appl. No.: 12/742,186

(22) PCT Filed: Nov. 7, 2008

(86) PCT No.: PCT/EP2008/065159
§ 371 (c)(1),
(2), (4) Date: Jul. 22, 2010

(87) PCT Pub. No.: WO2009/060079
PCT Pub. Date: May 14, 2009

(65) Prior Publication Data
US 2010/0283521 A1    Nov. 11, 2010

(30) Foreign Application Priority Data

Nov. 8, 2007  (FR) ...................................... 07 58891

(51) Int. Cl.
| | |
|---|---|
| *H03K 3/84* | (2006.01) |
| *F02D 41/20* | (2006.01) |
| *H02N 2/06* | (2006.01) |
| *H02M 1/14* | (2006.01) |
| *F02M 51/06* | (2006.01) |
| *F02M 69/04* | (2006.01) |

(52) U.S. Cl.
CPC ............. *H02M 1/14* (2013.01); *F02D 41/2096* (2013.01); *F02M 51/0603* (2013.01); *F02M 69/041* (2013.01); *H02N 2/067* (2013.01); *F02D 2041/2006* (2013.01)
USPC ...................................... 327/164

(58) Field of Classification Search
CPC ................................. H03K 3/84; G06F 7/588
USPC ......... 327/164–166, 168, 170–176, 184, 291, 327/530, 531, 547; 363/124, 131; 323/222, 323/266, 351
See application file for complete search history.

(56) References Cited

U.S. PATENT DOCUMENTS

| | | | | |
|---|---|---|---|---|
| 5,123,404 | A  * | 6/1992  | Takayama | 601/4 |
| 6,166,932 | A  * | 12/2000 | Otoshi | 363/56.03 |
| 7,330,366 | B2 * | 2/2008  | Lee et al. | 363/101 |
| 2005/0110454 | A1* | 5/2005  | Tsai et al. | 320/101 |

FOREIGN PATENT DOCUMENTS

| | | |
|---|---|---|
| DE | 101 50 414 | 6/2002 |
| EP | 1 398 487 | 3/2004 |

(Continued)

OTHER PUBLICATIONS

U.S. Appl. No. 13/124,335, filed Apr. 14, 2011, Nouvel.

(Continued)

*Primary Examiner* — Sibin Chen
(74) *Attorney, Agent, or Firm* — Oblon, Spivak, McClelland, Maier & Neustadt, L.L.P.

(57) ABSTRACT

A voltage pulse train generator which may find application to control of an ultrasound piezoelectric injector, and including a voltage source providing a DC initial voltage, a DC/DC converter supplied with the initial voltage and configured to charge a capacitor according to an intermediate DC voltage greater than the initial voltage, a DC/AC converter operating by switching, by alternating active phases and inactive phases, which is configured to transform the intermediate voltage from the capacitor into a final voltage pulse train, and a control unit provided for driving the converters. The DC/DC converter is configured to operate to charge the capacitor at a same time as the DC/AC converter, at most during the inactive phases of the switching of the DC/AC converter.

13 Claims, 2 Drawing Sheets

(56) References Cited

FOREIGN PATENT DOCUMENTS

| FR | 2 899 737 | 10/2007 |
| WO | 96 28878 | 9/1996 |

OTHER PUBLICATIONS

U.S. Appl. No. 13/116,675, filed May 26, 2011, Nouvel, et al.

* cited by examiner

VOLTAGE PULSE TRAIN GENERATOR, APPLICATION TO THE CONTROL OF AN ULTRASOUND PIEZOELECTRIC INJECTOR

BACKGROUND OF THE INVENTION

The present invention relates to a voltage pulse train generator and its application to the control of an ultrasound piezoelectric injector.

An ultrasound piezoelectric injector is a fuel injector that can be used in an internal combustion engine. It operates according to a principle that is described, for example, in the patent FR 99/14548. With respect to its control, it takes the form of an electric dipole and requires an AC voltage of high amplitude to be imposed across its two terminals in order to produce a mechanical resonance and thus obtain an injection of fuel throughout the time of application of said AC voltage.

Such an ultrasound piezoelectric generator requires control electronics, such as those described in FR 04/13277, capable of controlling it by generating voltage pulse trains, a pulse train beginning with the start of the injection phase of the combustion engine for said injector and ending with the end of said injection phase.

SUMMARY OF THE INVENTION

Referring to FIG. 1, this shows one embodiment of such a control device 12. This control device 12 comprises a voltage pulse train generator 11 and an injector selector 14 for switching the generated pulse train toward an injector 13 determined by choice. The voltage pulse train generator 11 comprises a voltage source 1, a direct current/direct current converter, denoted DC/DC converter 3, a direct current/alternating current converter, denoted DC/AC converter 6, and a control unit 10. The voltage source 1 supplies an initial DC voltage 2 to the DC/DC converter 3. Said DC/DC converter 3 is able to charge a capacitor 4, placed at its output, to an intermediate DC voltage 5 greater than the initial voltage 2. As an indication, if the initial voltage 2 obtained from the vehicle battery/network is approximately equal to 12 V, the intermediate voltage 5 at the capacitor 4 may be around 250 V. The DC/AC converter 6 is powered from the intermediate voltage 5. The latter, which operates according to the switching principle by alternating active phases 7 and inactive phases 8, is able to transform the intermediate voltage 5 into a final AC voltage 9 of an amplitude that is further increased. If the intermediate voltage 5 is around 250 V, the final voltage or amplitude of the final voltage pulse train 9 can reach between 1.2 and 1.8 kV. An injector 13 injects when it receives said final AC voltage 9. The latter voltage is produced when the injector 13 is in the injection phase. It is then interrupted, for example by stopping the drawing of the switching of the DC/AC converter 6 between two injection phases. The final voltage thus takes the form of a succession of voltage pulse trains, separated by zero voltage phases. A control unit 10 drives the converters 3, 6, and notably controls the switching.

The design principle of such a voltage pulse train generator 11, with two cascaded converters 3, 6, makes the simultaneous operation of the DC/DC converter 3 and the DC/AC converter 6 complicated for reasons of stability. Either the DC/DC converter 3 operates and charges the capacitor 4, or the DC/AC converter 6 operates and thus causes said capacitor 4 to discharge. This is not prejudicial to the injector control application, since the final AC signal or final voltage pulse train 9 does not need to be produced continuously, and the non-injection phases in which the DC/AC converter 6 does not operate can be exploited to operate the DC/DC converter 3, in order to recharge the capacitor 4.

However, such a usage principle that alternates two steps, charging of the capacitor 4 outside the injection phase, and discharging during the injection phase, presents a number of drawbacks. A first drawback is associated with the duration of the injection phase which can be between 500 µs and 5 ms relative to the duration of the complete cycle. The DC/DC converter 3 is deactivated throughout this phase, and the DC/AC converter 6 then drains significant energy from the capacitor 4. This leads to a progressive drop in the intermediate voltage 5 which becomes significant. This intermediate voltage 5 that has become very low may require significant time to be recharged, the time not necessarily being available before the start of the next injection phase.

A second drawback is associated with the operating principle of the DC/AC converter 6. If the intermediate voltage 5 that powers the DC/AC converter 6 varies too much, the latter loses its accuracy, and no longer guarantees the characteristics of the final signal 9.

It would therefore appear desirable to mitigate these drawbacks by maintaining an intermediate voltage 5 that is as stable as possible in order to be able to modulate the amplitude of the final voltage pulse train 9 at the output of the DC/AC converter 6 as accurately as possible.

The present invention remedies these various drawbacks, and its subject is a voltage pulse train generator comprising a voltage source supplying an initial DC voltage, a DC/DC converter powered by the initial voltage and able to charge a capacitor to an intermediate DC voltage greater than the initial voltage, a DC/AC converter operating in switched mode by alternating active phases and inactive phases, able to transform the intermediate voltage obtained from the capacitor into a final voltage pulse train, and a control unit for driving the converters. According to one feature of the invention, the DC/DC converter is able to operate, in order to charge the capacitor, at the same time as the DC/AC converter, at most during the inactive switching phases of the DC/AC converter.

Another subject of the invention is an ultrasound piezoelectric injector control device, comprising at least one voltage pulse train generator according to one of the preceding embodiments.

Another subject of the invention is a method of using such an ultrasound piezoelectric injector control device, comprising a holding step, in the injection phase, during which the two converters operate in phase opposition, one of the converters being in the active phase at most during the inactive phase of the other converter, and vice versa, in order to control an ultrasound piezoelectric injector.

One advantage of the device according to the invention is that it allows the inactive phases of the DC/AC converter to be used to operate the DC/DC converter and thus recharge the capacitor more regularly and for a longer time.

Because of the two-phase operation as described, a certain residual ripple on the intermediate voltage may be observed. However, the amplitude of this ripple is directly linked to the value of the capacitor and can advantageously be reduced by increasing the value of said capacitor.

Another advantage of the device according to the invention is that it enables the DC/AC converter to instantaneously modulate the voltage across the terminals of the injector because of a stable and regulated intermediate voltage, and thus to produce enhanced driving quality and finesse.

Another advantage of the device according to the invention is that the capacitor is much less stressed. The lower the voltage fluctuations across the terminals of a capacitor, the less energy is needed to be able to recharge it to a desired voltage set point. Current inrush is also lower. Controlling the intermediate voltage thus makes possible savings in dynamics and in recharging time of the capacitor. The power absorbed on the onboard network is thus less great. The DC/DC converter stage can be better dimensioned, with increased efficiency and a lower cost. It has already been stated that a high capacitor value is necessary to reduce the residual ripple on the intermediate voltage. However, advantageously, the capacitor does not need to be overdimensioned in terms of rms current.

BRIEF DESCRIPTION OF THE DRAWINGS

Other features, details and advantages of the invention will become more clearly apparent from the detailed description given below as an indication in relation to the drawings, in which.

DETAILED DESCRIPTION OF THE INVENTION

Figure 1:
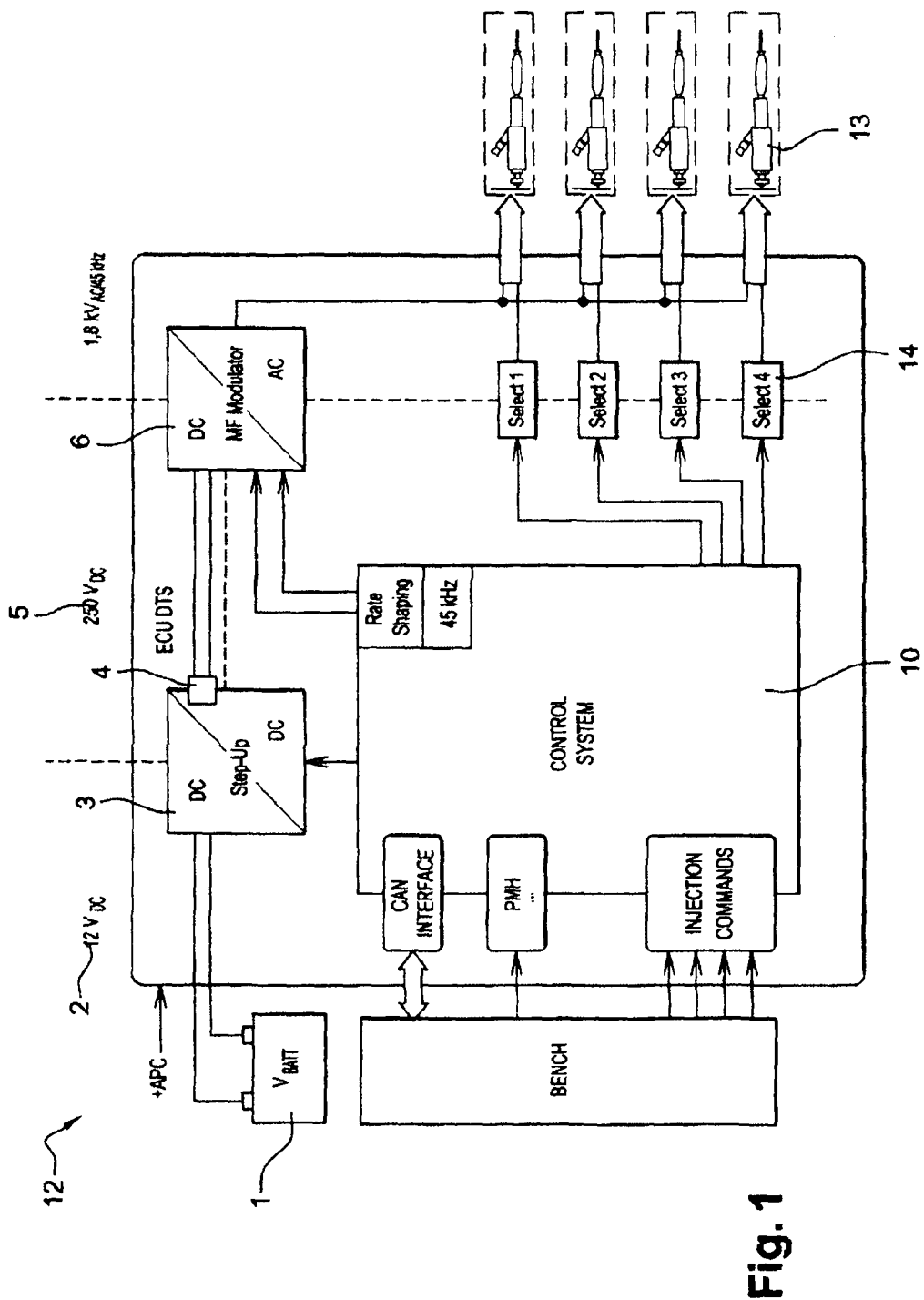
FIG. 1 illustrates an ultrasound piezoelectric injector control device in its usage context.

FIG. 1, already described in relation to the prior art, shows, according to the invention, a control device 12 comprising a voltage pulse train generator 11 comprising a voltage source 1 supplying an initial DC voltage 2, a DC/DC converter 3 powered by the initial voltage 2 and able to charge a capacitor 4 to an intermediate DC voltage 5 greater than the initial voltage 2, a DC/AC converter 6 operating in switched mode by alternating active phases 7 and inactive phases 8, able to transform the intermediate voltage 2 obtained from the capacitor 4 into a final voltage pulse train 9, and a control unit 10 for driving the converters 3, 6. According to the invention, the DC/DC converter 3 is able to operate, in order to charge the capacitor 4, at the same time as the DC/AC converter 6, at most during the inactive switching phases 8 of the DC/AC converter 6. In practice, the DC/AC converter 6 operating according to the switching principle will exhibit a succession of active phases 7 and inactive phases 8. By this very principle, the DC/AC converter 6 short circuits the capacitor 4 through an inductor, by means of a transistor, during an active phase 7. However, during an inactive phase 8, this transistor is blocked. This blocking can be exploited to recharge said capacitor 4 by operating the DC/DC converter 3 during all or part, or for at most the full duration, of an inactive phase 8. It would be possible not to use some of the inactive phases 8.

A converter is said to be active when said converter drains energy from its source. On the other hand, a converter is said to be passive or inactive when the stored energy is transferred down line.

Figure 2:
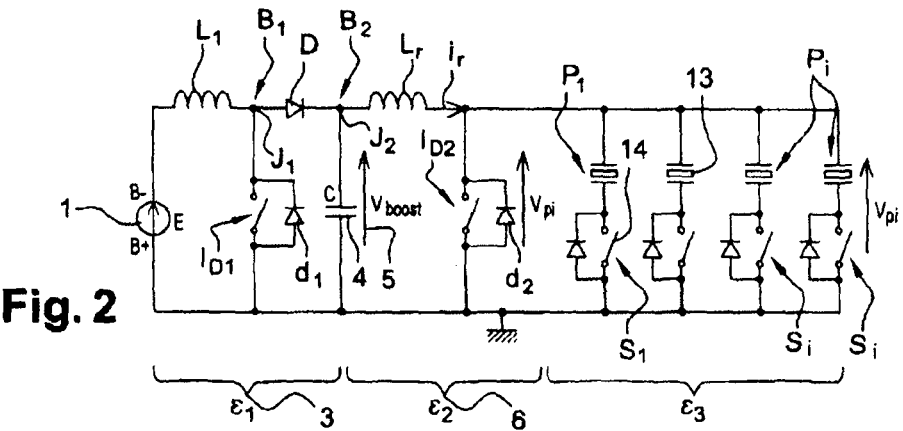
FIG. 2 illustrates a particular embodiment of such a control device.

FIG. 2, taken from FR 04/13277, illustrates a particular embodiment of a control device 12. The different stages of the pulse generator 11/ultrasound piezoelectric injector control device 12 are shown from left to right. A battery E is a voltage source 1. The set of components comprising an inductor L1, a diode D and a switch ID1 coupled to a diode d1 constitutes, with a capacitor C, 4 at the output, the DC/DC converter 3, also identified ϵ1. The set of components comprising an inductor Lr and a switch ID2 coupled to a diode d2 constitutes the DC/AC converter 6, also identified ϵ2. These three sets constitute, with a control unit 10 that is not represented, a voltage pulse train generator 11. The functional switches ID1 and ID2 are advantageously transistors in order to be able to be controlled. The function of the control unit 10 is to control these transistors, this providing the switching and therefore implementing the DC/DC and DC/AC functions by respectively driving the switches ID1 and ID2.

Said generator 11 is complemented with a third stage ϵ3 comprising an injector selector 14, Si. The generator 11 and the selector assembly 14 constitute a control device 12. Each selector Si is associated with a respective injector 13. Thus, the opening of all the selectors Si except that of a given injector 13 causes the voltage pulse train 9 produced by the generator 11 to be sent to said given injector 13, and controls the injection.

The selector 14 also serves as a multiplexer in an assembly with a generator 11 and a plurality of injectors 13. It is also possible to eliminate the selector 14 by using a generator 11 associated with each injector 13. However, such an arrangement is not economically advantageous, and the multiplexed assembly is preferred. Such a multiplexed assembly does, however, have the drawback of reducing the time available between two injections, all the more so as the number of injectors 13 increases. In order to recharge the capacitor 4, the DC/DC converter 3 has, within the limits of the prior art, only the time between the end of an injection for an injector 13 and the start of the injection of the next injector. Here too, the invention that makes it possible to charge the capacitor 4 while the DC/AC converter 6 is operating appears very advantageous.

Like the DC/AC converter 6, the DC/DC converter 3 can also operate in switched mode. One example of such a converter is given in the assembly described previously in conjunction with FIG. 2. The switching of the DC/DC converter 3, controlled by the control unit 10, is advantageously performed at a switching frequency identical to that of the DC/AC converter 6, the two converters operating in phase opposition, one of the converters (DC/DC, or DC/AC) being in the active phase 7 at most during the inactive phase 8 of the other converter (DC/AC, or DC/DC). Thus, the circuit of the DC/AC converter is never active at the same time as the circuit of the DC/DC converter. According to the embodiment of FIG. 2, the switches ID1 and ID2 are never simultaneously closed. The active phases of each of the converters 3, 6 are interleaved.

Figure 3:
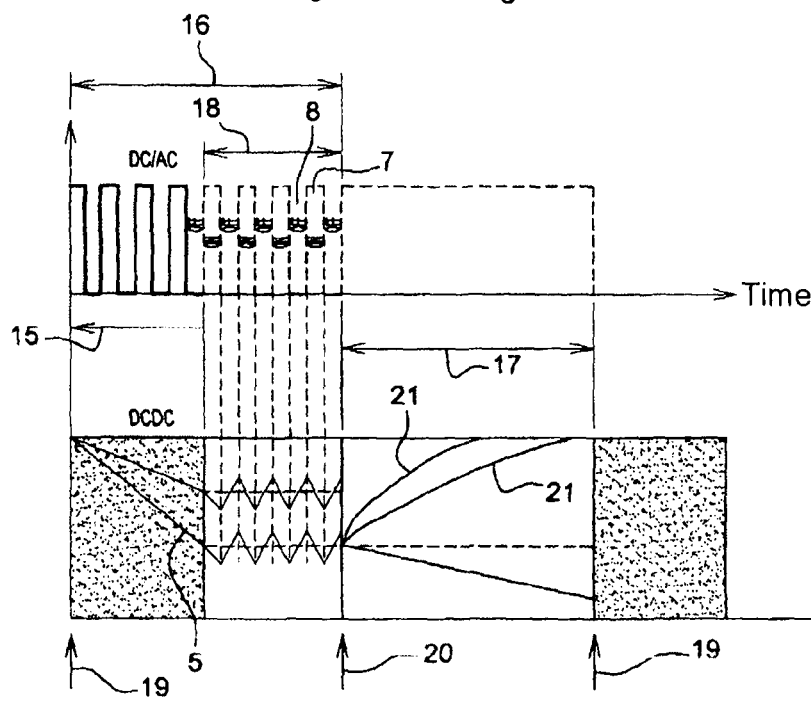
FIG. 3 illustrates a timing diagram of use of an ultrasound piezoelectric injector control device.

With reference to FIG. 3, this describes an operating timing diagram of the generator 11/control device 12. The bottom portion of timing diagram shows, as a function of time, the behavior of the DC/AC converter 3 and the top portion shows the behavior of the DC/AC converter 6. The diagram is periodic, the period being limited between two injection start instants 19. The duration of the injection phase is typically between 0.5 and 5 ms. At the injection start instant 19, an injection phase 18 begins, ending at the injection end instant 20, and followed by a recharging phase 17.

During the injection phase 18, a holding phase 16 is applied. During this holding phase 16, the two converters 3, 6 operate in phase opposition, one of the converters 3, 6 being in active phase 7 at most during the inactive phase 8 of the other converter 6, 3, and vice versa. The DC/AC converter 6 operates in switched mode by alternating the active phases 7 and the inactive phases 8 according to a predetermined switching frequency, for example equal to 45 kHz. The duty cycle is, for example, 0.5. The DC/DC converter 3 exploits the inactive phases 8 of the DC/AC converter 6 in order to operate. In the case of a switched mode DC/DC converter 3, its own active phases are included in the inactive phases 8 of the DC/AC converter 6. Thus, the intermediate voltage 5, during the holding phase 16, exhibits ripple: it reduces during an active phase 7 of the DC/AC converter 6 which discharges the capacitor 4 and it increases during an inactive phase 8 of the DC/AC converter 6, the DC/DC converter 3 charging said capacitor 4. The intermediate voltage 5 thus remains substantially constant during the holding phase.

The holding phase 16 may be entirely concurrent with the injection phase 18. Alternatively, for issues more particularly discussed in FR 04/13277, in order to regulate transient phenomena, the holding phase 16 may advantageously be preceded by an activation phase 15, at the start of the injection phase 18. During this activation phase 15, the DC/DC converter 3 remains inactive, whereas the DC/AC converter 6 operates. In this phase, the intermediate voltage 5 decreases. This activation phase 15 remains short in relation to the holding phase 16 and typically lasts between 20 and 200 µs.

After the injection phase 18, there is a recharging phase 17, during which the DC/DC converter 3 operates in order to recharge the capacitor 4, whereas the DC/AC converter 6 does not operate. This phase begins at the start of injection 20 of an injector 13 and ends with the start of injection 19 of the next injector 13 in the injection sequence.

During the recharging phase 17, the intermediate voltage 5 increases according to a profile 21 dependent on the characteristics of the DC/DC converter 3 and its driving. Thus, in the case of a switched mode DC/DC converter, the control unit can vary a number of characteristics of the DC/DC converter 3. This is done independently of the DC/AC converter 6 which is inactive, and therefore independently of the resonance frequency of the injectors 13. The control unit 10 thus determines a switching frequency. A typical value is 100 kHz. In order to obtain the intermediate voltage value 5 necessary for the operation of the DC/AC converter at the start of the next injection cycle, the control unit 10 may vary the switching duty cycle, typically between 0 and 0.9. It can also vary the operating time. Thus, if the capacitor 4 is sufficiently recharged before the next start of injection 19, the driving of the DC/DC converter may be stopped.

Figure 4:
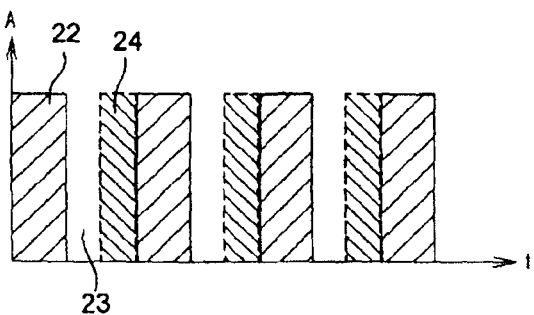
FIG. 4 illustrates the same timing diagram for a particular embodiment.

Referring to FIG. 4, this illustrates an advantageous embodiment. The timing diagram of FIG. 4 indicates, as a function of time, the relative activity phases of the DC/AC converter 6 and of the DC/DC converter 3. Thus, one of the converters 3, 6 is active in a phase 22 and inactive in a phase 23. The other converter 6, 3 is active 24, with, advantageously, an activity 24 positioned at the end of the inactivity phase 23 of the first converter 3, 6.

The invention claimed is:

1. A voltage pulse train generator comprising:
   a voltage source supplying an initial DC voltage;
   a DC/DC converter powered by the initial voltage and configured to charge a capacitor to an intermediate DC voltage greater than the initial voltage;
   a DC/AC converter operating in a switched mode by alternating active phases and inactive phases, configured to transform the intermediate voltage obtained from the capacitor into a final voltage pulse train; and
   a control unit that drives the converters,
   wherein the DC/DC converter is configured to operate, to only charge the capacitor during the inactive switching phases of the DC/AC converter.

2. The generator as claimed in claim 1, in which the DC/DC converter operates in the switched mode, with a switching frequency identical to that of the DC/AC converter, the two converters operating in phase opposition, one of the converters being in the active phase during the inactive phase of the other converter, and vice versa.

3. An ultrasound piezoelectric injector control device, comprising:
   at least one voltage pulse train generator as claimed in claim 1, a final voltage pulse train controlling at least one ultrasound piezoelectric injector during the injection phase.

4. The device as claimed in claim 3, further comprising an injector selector that sends the final voltage pulse train obtained from the voltage pulse train generator to a predetermined injector of a plurality of injectors.

5. The device as claimed in claim 3, further comprising a voltage pulse train generator associated with each injector.

6. A method of using an ultrasound piezoelectric injector control device as claimed in claim 3, comprising a holding, in the injection phase, during which the two converters operate in phase opposition, one of the converters being in the active phase at most during the inactive phase of the other converter, and vice versa, to control an ultrasound piezoelectric injector.

7. The method as claimed in claim 6, further comprising, before the holding, an activation, at a start of the injection phase, during which the DC/DC converter does not operate, while the DC/AC converter operates to activate an ultrasound piezoelectric injector.

8. The method as claimed in claim 6, further comprising, after the holding, recharging the capacitor, outside the injection phase, during which the DC/DC converter operates to recharge the capacitor, while the DC/AC converter does not operate.

9. The method as claimed in claim 8, in which the switching of the DC/DC converter exhibits a duty cycle and/or an operating time that are variable to vary recharging as a function of the desired intermediate voltage and of the time available before the next injection phase.

10. The method as claimed in claim 6, in which one of the converters is in active phase at the end of the inactive phase of the other converter, and vice versa.

11. The generator as claimed in claim 1, wherein an amplitude voltage of the final voltage pulse train is larger than a voltage value of the intermediate voltage.

12. The generator as claimed in claim 11, wherein the amplitude voltage of the final voltage pulse train is between 1.2 and 1.8 kV.

13. The generator as claimed in claim 1, wherein the initial DC voltage is approximately 12 V.

* * * * *